United States Patent
Cullen et al.

[11] 3,907,804
[45] Sept. 23, 1975

[54] 3,6-BIS-(AMINOACYLAMINO)-ACRIDINES
[75] Inventors: Ernest Cullen, Montreal, Canada; Peter Meindl, Vienna, Austria; Hans Tuppy, Vienna, Austria; Gerhard Bodo, Vienna, Austria
[73] Assignees: Boehringer Ingelheim GmbH, Ingelheim am Rhein; Dr. Karl Thomae GmbH, Biberach an der Riss, both of Germany
[22] Filed: June 4, 1973
[21] Appl. No.: 366,732

[30] Foreign Application Priority Data
June 7, 1972 Austria .................. 4878/72

[52] U.S. Cl. ..... 260/279 R; 260/243 B; 260/246 B; 260/268 TR; 424/246; 424/248; 424/257
[51] Int. Cl.² .................................. C07D 219/06
[58] Field of Search ..................... 260/279

[56] References Cited
OTHER PUBLICATIONS
Ettel et al., "Chem. Abstracts," Vol. 52, pp. 4642 & 4643, (1968).

Primary Examiner—Donald G. Daus
Assistant Examiner—D. B. Springer
Attorney, Agent, or Firm—Hammond & Littell

[57] ABSTRACT

Compounds of the formula

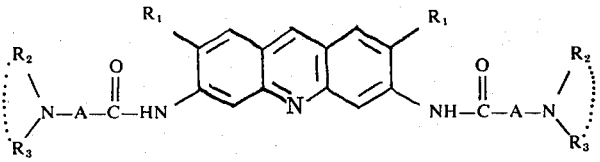

wherein
  $R_1$ is hydrogen or methyl,
  $R_2$ and $R_3$, which may be identical to or different from each other, are each hydrogen, lower alkyl, hydroxy-lower alkyl, lower alkylamino-lower alkyl, cycloalkyl, aralkyl, aryl or, together with each other and the nitrogen atom to which they are attached, form a saturated or unsaturated heterocyclic ring system which may optionally contain one or more additional heteroatoms, and
  A is lower alkylene or aryl-lower alkylene,
and non-toxic, pharmacologically acceptable acid addition salts thereof; the compounds as well as their salts are useful as inducers of the formation of interferon.

5 Claims, No Drawings

3,6-BIS-(AMINOACYLAMINO)-ACRIDINES

This invention relates to novel 3,6-bis-(aminoacylamino)-acridines and their acid addition salts, as well as to methods of preparing these compounds.

More particularly, the present invention relates to a novel class of 3,6-bis-(aminoacyl-amino)-acridines represented by the formula

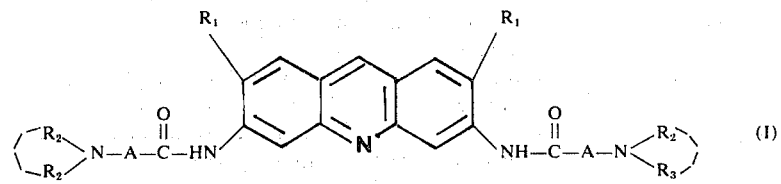

wherein
$R_1$ is hydrogen or methyl,
$R_2$ and $R_3$, which may be identical to or different from each other, are each hydrogen, lower alkyl, hydroxy-lower alkyl, lower alkylamino-lower alkyl, cycloalkyl, aralkyl, aryl or, together with each other and nitrogen atom to which they are attached, form a saturated or unsaturated heterocyclic ring system which may optionally contain one or more additional heteroatoms, and
A is lower alkylene or aryl-lower alkylene, and nontoxic, pharmacologically acceptable acid addition salts thereof.

The compounds embraced by formula I may be prepared either by reacting a 3,6-bis-(haloacyl-amino)-acridine of the formula

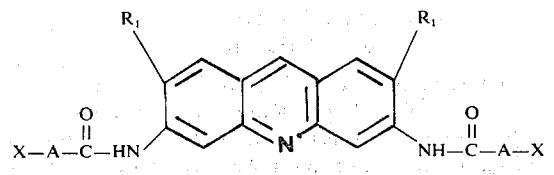

wherein $R_1$ and A have the same meanings as in formula I and X is chlorine, bromine or iodine, with an amine of the formula

wherein $R_2$ and $R_3$ have the same meanings as in formula I; or by reacting a 3,6-diamino-acridine of the formula

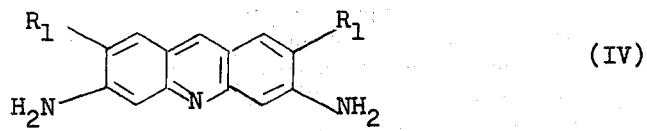

wherein $R_1$ has the meanings previously defined, with an aminoester of the formula

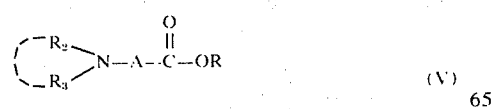

wherein $R_2$, $R_3$ and A have the meanings previously defined and R is lower alkyl.

In either case, the reaction is carried out at room temperature or elevated temperatures, optionally in the presence of an inert solvent medium and, if required, in the presence of an inorganic or organic base, such as sodium bicarbonate, potassium carbonate, sodium hydroxide, triethylamine or the like. Examples of suitable solvent media are ethanol, dimethylformamide, dimethylsulfoxide or the like, or mixtures of these; if the amine of the formula III is itself a liquid at the reaction temperature, the presence of a separate solvent medium is not essential, provided that a sufficient excess of the liquid amine is present to act as the solvent medium.

The starting compounds embraced by formula II may be prepared by known methods, such as by acylation of a corresponding acridine derivative with free amino-substituents of the formula IV under conventional acylation conditions, such as by reaction with an acyl halide or an acyl anhydride, preferably while heating.

The compounds of the formula I are organic bases and therefore form acid addition salts with inorganic or organic acids. Examples of non-toxic, pharmacologically acceptable acid addition salts are those formed with hydrohalic acids, nitric acid, sulfuric acid, orthophosphoric acid, oxalic acid, citric acid, tartaric acid, fumaric acid, maleic acid, propionic acid, butyric acid, acetic acid, methanesulfonic acid, succinic acid, 8-chlorotheophylline or the like.

Using the above-described methods, the following compounds can be prepared:

3,6-bis-[(N,N-dimethylamino)-acetylamino]-acridine, 3,6-bis-[(N-ethylamino)-acetylamino]-acridine, 3,6-bis-[(N,N-diethylamino)-acetylamino]-acridine, 3,6-bis-[(N,N-diethylamino)-acetylamino]-2,7-dimethyl-acridine, 3,6-bis-[3-(N,N-diethylamino)-propionylamino]-acridine, 3,6-bis-[2-(N,N-diethylamino)-propionylamino]-acridine, 3,6-bis-[4-(N,N-diethylamino)-butyrylamino]-acridine, 3,6-bis-[(N,N-diethylamino)-tert.butyrylamino]-acridine,
3,6-bis-[5-(N,N-diethylamino)-valeroylamino]-acridine,
3,6-bis-[(N-methyl-N-2-hydroxyethylamino)-acetylamino]-acridine,
3,6-bis-[(α-N,N-diethylamino)-phenylacetamido]-acridine,
3,6-bis-[(N,N-di-n-propylamino)-acetylamino]-acridine,
3,6-bis-[(N,N-di-isopropylamino)-acetylamino]-acridine,
3,6-bis-[(N,N-di-n-butylamino)-acetylamino]-acridine,
3,6-bis-[(N,N-di-n-hexylamino)-acetylamino]-acridine,
3,6-bis-[(N-n-propylamino)-acetylamino]-acridine,
3,6-bis-[(N-isopropylamino)-acetylamino]-acridine,
3,6-bis-[(N-n-butylamino)-acetylamino]-acridine,
3,6-bis-[(N-n-hexylamino)-acetylamino]-acridine,
3,6-bis-[(N,N-diallylamino)-acetylamino]-acridine,
3,6-bis-[(N-ethyl-N-2-hydroxyethylamino)-acetylamino]-acridine,
3,6-bis-[(N,N-di-2-hydroxyethylamino)-acetylamino]-acridine,
3,6-bis-{[N-(N',N'-diethylamino)-propylamino]-acetylamino}-acridine,
3,6-bis-{[N-methyl-N-(N',N'-diethylamino)-propylamino]-acetylamino}-acridine,
3,6-bis-[(N-cyclohexylamino)-acetylamino]-acridine,
3,6-bis-[(N-methyl-N-cyclohexylamino)-acetylamino]-acridine,
3,6-bis-[(N-ethyl-N-cyclohexylamino)-acetylamino]-acridine,
3,6-bis-[(N-propyl-N-cyclohexylamino)-acetylamino]-acridine,
3,6-bis-[(N-isopropyl-N-cyclohexylamino)-acetylamino]-acridine,
3,6-bis-[(N-n-butyl-N-cyclohexylamino)-acetylamino]-acridine,
3,6-bis-[(N,N-di-cyclohexylamino)-acetylamino]-acridine,
3,6-bis-[(N-ethyl-N-cyclopentylamino)-acetylamino]-acridine,
3,6-bis-[N-n-propyl-N-cyclopentylamino)-acetylamino]-acridine,
3,6-bis-[(N-n-butyl-N-cyclopentylamino)-acetylamino]-acridine,
3,6-bis-[(N-benzylamino)-acetylamino]-acridine,
3,6-bis-[(N-methyl-N-benzylamino)-acetylamino]-acridine,
3,6-bis-[(N,N-dibenzylamino)-acetylamino]-acridine,
3,6-bis-[2-(N-methyl-N-cyclohexylamino)-propionylamino]-acridine,
3,6-bis-[(N-methyl-N-phenylamino)-propionylamino]-acridine,
3,6-bis-(pyrrolidino-acetylamino)-acridine,
3,6-bis-[2-(piperidino)-propionylamino]-acridine,
3,6-bis-[(3'-methylpiperidino)-acetylamino]-acridine,
3,6-bis-[(2'-methylpiperidino)-acetylamino]-acridine,
3,6-bis-[(4'-methylpiperidino)-acetylamino]-acridine,
3,6-bis-[(3'-hydroxypiperidino)-acetylamino]-acridine,
3,6-bis-[(4'-ethoxycarbonylpiperidino)-acetylamino]-acridine,
3,6-bis-[(4'-hydroxymethylpiperidino)-acetylamino]-acridine,
3,6-bis-(1,2,5,6-tetrahydropyridino-acetylamino)-acridine,
3,6-bis-(hexamethyleneimino-acetylamino)-acridine,
3,6-bis-[(4'-β-hydroxyethyl-piperazino)-acetylamino]-acridine,
3,6-bis-(morpholino-acetylamino)-acridine,
3,6-bis-[(N-thiomorpholino)-acetylamino]-acridine,
3,6-bis-[(N-thiomorpholino-S-oxide)-acetylamino]-acridine,
3,6-bis-[(N-thiomorpholino-S,S-dioxide)-acetylamino]-acridine,
3,6-bis-(piperidino-acetylamino)-acridine,
and their non-toxic, pharmacologically acceptable acid addition salts.

The following examples further illustrate the present invention and will enable others skilled in the art to understand it more completely. It should be understood, however, that the invention is not limited solely to the particular examples given below.

EXAMPLE 1

3,6-Bis-(morpholinoacetyl-amino)-acridine trihydrochloride dihydrate

A mixture consisting of 35 gm of 3,6-bis-(chloroacetyl-amino)-acridine, 35 gm of morpholine and 600 ml of dimethylformamide was heated for 2 hours on a boiling water bath. Thereafter, the unreacted morpholine and the solvent were evaporated, and the residue was purified by repeated crystallization from acetic acid/water, ethanol/water and aqueous ethanol containing a trace of hydrochloric acid, yielding 15 gm of the compound of the formula

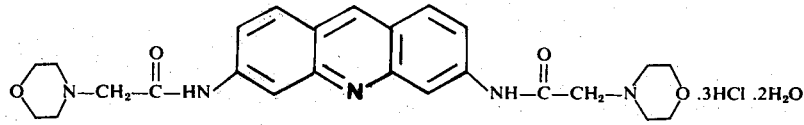

which had a melting point of 300°C.

The starting compound, 3,6-bis-(chloroacetyl-amino)-acridine, was prepared in conventional manner by acetylating proflavin with chloroacetyl chloride or chloroacetic acid anhydride.

EXAMPLE 2

3,6-Bis-[(N,N-diethylamino-acetyl)-amino]-acridine trihydrochloride

A mixture consisting of 18.2 gm of 3,6-bis-(chloroacetyl-amino)-acridine, 36.5 gm of diethylamine and 100 ml of dimethylformamide was stirred for 4 hours at 100°C, and then allowed to stand overnight at room temperature. Thereafter, 100 ml of ethyl acetate were added to the reaction mixture, the diethylamine hydrochloride precipitated thereby was filtered off, the filtrate was acidified with saturated ethereal hydrochloric acid, and the precipitate formed thereby was collected by filtration, washed with ether and recrystallized from methanol in the presence of animal charcoal. The crystals were extracted with a mixture of chloroform and methanol (9:1) in a Soxhlet apparatus, the extracts were evaporated to dryness, and the residue was recrystallized from methanol, yielding the compound of the formula

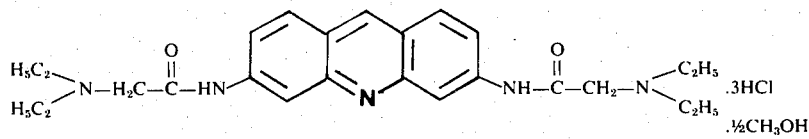

which had a melting point of 287°C (decomp.).

EXAMPLE 3

3,6-Bis-[(N,N-dimethylamino-acetyl)-amino]-acridine trihydrochloride

A mixture consisting of 1.85 gm of 3,6-bis-(chloroacetyl-amino)-acridine hydrochloride, 3.0 gm of dimethylamine and 10 ml of dimethylformamide was heated for two hours at 100°C in a pressure vessel and was then allowed to stand overnight at room temperature. Thereafter, 20 ml of ethyl acetate were added to the reaction mixture, the precipitate formed thereby was filtered off, and the filtrate was acidified with an excess of ethereal hydrochloric acid. The crystals which separated out were collected by filtration and recrystallized once from methanol/water and twice from dioxane/water, yielding 0.9 gm of 3,6-bis-[(N,N-dimethylamino-acetyl)-amino]-acridine trihydrochloride which had a melting point above 300°C (decomp.).

EXAMPLE 4

3,6-Bis-[(N-ethylamino-acetyl)-amino]-acridine trihydrochloride

A mixture consisting of 1.82 gm of 3,6-bis-(chloroacetyl-amino)-acridine hydrochloride, 3 gm of ethylamine and 10 ml of dimethylformamide was heated for 2 hours at 100°C in a pressure vessel and was then allowed to stand at room temperature overnight. Thereafter, the unreacted excess of ethylamine was distilled off in vacuo, the residue, 3,6-bis-[(N-ethylamino-acetyl)-amine]-acridine, was converted into its trihydrochloride by addition of ethanolic hydrochloric acid, and the salt was recrystallized 3 times from dioxane/water, whereupon it had a melting point of 280°C (decomp.). The yield was 1.1 gm.

EXAMPLE 5

3,6-Bis-[(3'-N,N-diethylamino-propionyl)-amino]-acridine trihydrochloride dihydrate 3.6 gm of dimethylamine were added to a suspension of 2.1 gm of 3,6-bis-[(3-chloro-propionyl)-amino]-acridine hydrochloride in 20 ml of dimethylformamide, and the solution formed thereby was heated for 2 hours at 95°C on a water bath. Thereafter, the reaction solution was evaporated in vacuo until a thick oil remained, water was added to this oil, and the precipitate formed thereby was collected by filtration and crystallized twice from acetonitrile, yielding the free base 3,6-bis-[(3'-N,N-diethylamino-propionyl)-amino]-acridine.

The base was dissolved in chloroform, gaseous hydrogen chloride was passed through the solution, and the precipitate formed thereby was collected, washed and dried, yielding 1.1 gm of the compound of the formula

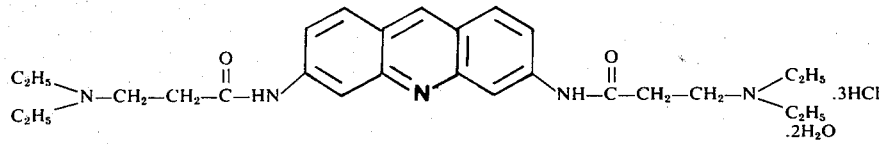

which had a melting piont of 239°–241°C.

The starting compound was prepared in conventional manner from proflavine and 3-chloropropionyl chloride.

EXAMPLE 6

3,6-Bis-[(N,N-di-n-propylamino-acetyl)-amino]-acridine trihydrochloride hemihydrate A mixture consisting of 1.8 gm of 3,6-bis-(chloroacetyl-amino)-acridine hydrochloride, 3.0 gm of di-n-propylamine and 10 ml of dimethylformamide was heated for three hours on a boiling water bath. Thereafter, the unreacted excess of dipropylamine was evaporated, and ethereal hydrochloric acid was added to the residual mixture. The oil formed thereby was taken up in chloroform, the resulting solution was filtered through animal charcoal, and ethyl acetate was added to the filtrate. The precipitate formed thereby was collected, dissolved in isopropanol, reprecipitated by addition of ethyl acetate and again collected, treated with hot acetonitrile, filtered off, washed and dried, yielding 0.9 gm of 3,6-bis-[(N,N-di-n-propylamino-acetyl)-amino]-acridine trihydrochloride hemihydrate which had a melting point of 190°–210°C (decomp.).

EXAMPLE 7

3,6-Bis-[(2'-N,N-diethylamino-propionyl)-amino]-acridine trihydrochloride dihydrate 3.6 gm of diethylamine were added to a solution of 2.4 gm of 3,6-bis-(α-bromopropionyl-amino)-acridine in 20 ml dimethylformamide, and the resulting mixture was heated for 2 hours at 95°C on a water bath. Thereafter, the reaction mixture was concentrated in vacuo until an oil remained, and this oil was admixed with water whereby a solid substance was formed which was filtered off, washed, dried and crystallized from ethanol. The crystals, 3,6-bis-[(2-N,N-diethylamino-propionyl)-amino]-acridine, were dissolved in chloroform, the resulting solution was acidified with an excess of 2 N ethereal hydrochloric acid, the precipitate formed thereby was collected and redissolved in hot isopropanol, the resulting solution was treated with animal charcoal, and the product was reprecipitated by addition of ethyl acetate, yielding 1.0 gm of the compound of the formula 3.6 gm of diethylamine were added to a solution of 2.6 gm of 3,6-bis-(α-chloro-phenylacetamido)-acridine in 15 ml of dimethylformamide, and the mixture was heated for 2 hours at 95°C on a water bath. Thereafter, the reaction mixture was evaporated until a thick oil remained to which 50 ml of acetyl acetate and then ethereal hydrochloric acid were added. The precipitate formed thereby was collected by filtration, dissolved in water, the aqueous solution was made alkaline with ammonia, and the precipitate formed thereby was filtered off and recrystallized 3 times from ethanol, yielding 1.8 gm of the free base of the formula

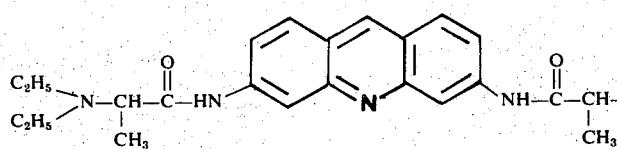

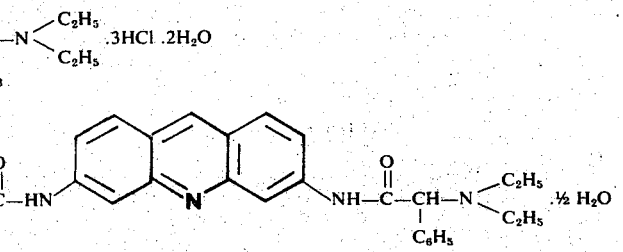

which had a melting point of 250°–255°C.

The starting compound, 3,6-bis-(α-bromopropionylamino)-acridine, was prepared in conventional manner from proflavine and 2-bromo-propionyl bromide.

EXAMPLE 8

3,6-Bis-[(N-methyl-N-β-hydroxyethyl-amino)-acetylamino]-acridine and its trimaleate hydrate A mixture consisting of 4.35 gm of 3,6-bis-(chloroacetyl-amino)-acridine, 5.5 gm of potassium carbonate, 1.88 gm of N-methyl-N-β-hydroxyethylamine and 50 ml of dimethylsulfoxide was stirred overnight at room temperature. Thereafter, the reaction mixture was poured over ice, and the precipitate formed thereby was collected, washed and recrystallized from ethanol/ether, yielding 2.4 gm of the free base of the formula which had a melting point of 106°–108°C.

290 mgm of the base were dissolved in 4 ml of acetone, the solution was admixed with a solution of 180 mgm of maleic acid in 2 ml of acetone, and the mixture was stirred overnight at room temperature. The yellow crystals formed thereby were filtered off and recrystallized from ethanol, yielding 310 mgm of the trimaleate hemihydrate of the base, which had a melting point of 119°C.

The starting compound, 3,6-bis-(α-chlorophenylacetamido)-acridine, was prepared in conventional manner from proflavine and α-chlorophenylacetyl chloride.

EXAMPLE 10

3,6-Bis-[(N-ethyl-N-β-hydroxyethylamino-acetyl)-amino]-acridine and its trimaleate

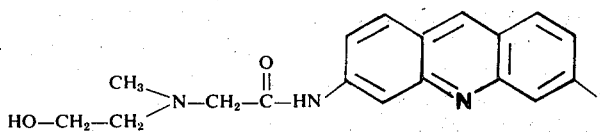 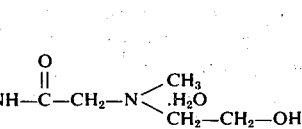

which had a melting point of 183°–185°C.

500 mgm of the twice recrystallized free base were suspended in acetone and, while stirring the suspension, a solution of 530 mgm of maleic acid in 5 ml of acetone was added. The mixture was stirred overnight, and the precipitate formed thereby was collected by filtration, washed and dried, yielding 720 mgm of the trimaleate hydrate of the base, which had a melting point of 145°–146°C.

A mixture consisting of 3.0 gm of 3,6-bis-(chloroacetyl-amino)-acridine and 15 ml of N-ethyl-N-β-hydroxyethylamine was stirred for 4 hours at room temperature. Thereafter, the clear syrupy solution which was formed thereby was diluted with 500 ml of chloroform and washed with water. The chloroform phase was dried and evaporated to dryness in vacuo, and the residue (4.0 gm) was crystallized twice from ethanol, yielding 1.7 gm of the free base of the formula

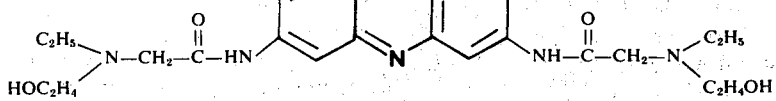

EXAMPLE 9

3,6-Bis-[(α-N,N-diethylamino-phenylacetamido]-acridine and its trimaleate hemihydrate which had a melting point of 175°–176°C.

1.6 gm of the free base were suspended in acetone, and the suspension was admixed with an excess (1.4 gm) of maleic acid, and the mixture was stirred for five hours. Thereafter, the precipitate was collected by filtration, washed with acetone and dried, yielding 2.6 gm of the trimaleate of the base, which had a melting point of 126°–130°C.

EXAMPLE 11

3,6-Bis-[(N,N-di-β-hydroxyethylamino-acetyl)-amino]-acridine and its trimaleate

A mixture consisting of 4.35 gm of 3,6-bis-(chloroacetyl-amino)-acridine, 5.5 gm of potassium carbonate, 2.62 gm of diethanolamine and 22 ml of dimethylsulfoxide was stirred overnight at room temperature, then filtered, and the filtrate was poured over ice. The precipitate formed thereby was collected by filtration, washed, and recrystallized once from ethanol and three times from methanol, yielding 3.5 gm of the free base of the formula

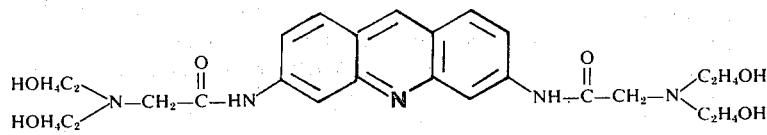

which had a melting point of 175°C (sinters at 165°C).

350 mgm of the free base were dissolved in 8 ml of acetone, 350 mgm of maleic acid were added to the solution, and the mixture was allowed to stand at room temperature for four hours. Thereafter, the precipitate which had formed was collected by filtration, washed and dried, yielding the trimaleate of the base, which had a melting point of 130°–131°C (sintering beginning at 122°C).

EXAMPLE 12

3,6-Bis-{[N-methyl-N-(N',N'-diethylamino)-N-propyl-amino]acetylamino}-acridine and its pentamaleate A mixture consisting of 1.1 gm of 3,6-bis-(chloroacetyl-amino)-acridine, 800 mgm of 1-diethylamino-3-methylamino-propane, 1.1 gm of potassium carbonate and 20 ml of dimethylsulfoxide was stirred overnight at room temperature. Thereafter, the reaction mixture was diluted with 200 ml of ethyl acetate, washed with water, dried and evaporated to dryness. The residue, i.e. the raw free base of the formula

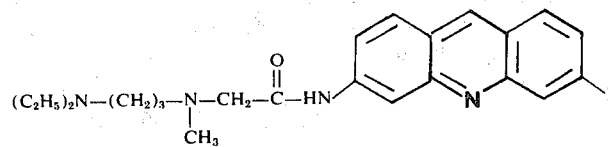

was dissolved in ethanol, the solution was admixed with a slight excess of an ethanolic solution of maleic acid, and the precipitate formed thereby was collected by filtration, washed and recrystallized twice from ethanol in the presence of animal charcoal, yielding 1.9 gm of the pentamaleate of the base, which had a melting point of 98°–101°C.

EXAMPLE 13

3,6-Bis-(piperidinoacetyl-amino)-acridine 9.4 ml (0.11 mol) of piperidine were added to a solution of 4.0 gm (0.011 mol) of 3,6-bis-(chloroacetylamino)-acridine in dimethylformamide, and the mixture was heated at 100°C for about 4 hours. Thereafter, the reaction mixture was allowed to cool and was then admixed with 22 ml of ethyl acetate. The piperidine hydrochloride which separated out slowly was separated by vacuum filtration. The clear filtrate was admixed with ethereal hydrochloric acid until the mixture reacted strongly acidic, and the precipitate formed thereby was collected by vacuum filtration, washed with an ample amount of ether and dried. The substance thus obtained was dissolved in 750 ml of water, and the resulting solution was admixed dropwise with 50 ml of aqueous 25% ammonia, accompanied by vigorous stirring. A brownish oil separated out which gradually crystallized throughout, and the crystallizate was collected, thoroughly washed with water and dried at room temperature in vacuo over phosphorus pentoxide, yielding 4.94 gm (97.3% of theory) of raw 3,6-bis-(piperidinoacetyl-amino)-acridine of the formula

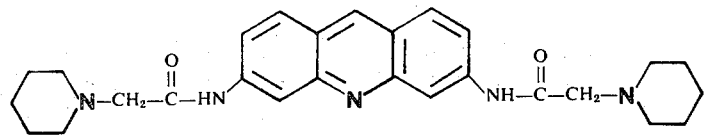

The raw product was recrystallized twice from ethanol, yielding 82% of theory of the pure product which had a melting point of 192°–194°C.

EXAMPLE 14

Using a procedure analogous to that described in Example 13, 84.5% of theory of 3,6-bis-[(N,N-diisopropylamino-acetyl)-amino]-acridine hydrate, m.p. 123°–126°C (recrystallized from ethanol/water), was obtained from 3,6-bis-(chloroacetyl-amino)-acridine and diisopropylamine.

EXAMPLE 15

Using a procedure analogous to that described in Example 13, 78.5% of theory of 3,6-bis-[(N,N-dibutylaminoacetyl)-amino]-acridine, m.p. 145°–147°C (recrystallized from ethanol/water), was obtained from 3,6-bis-(chloroacetylamino)-acridine and dibutylamine.

EXAMPLE 16

Using a procedure analogous to that described in Example 13, 49% of theory of 3,6-bis-[(N,N-diallylaminoacetyl)-amino]-acridine, m.p. 102°–103°C (recrystallized from ethanol/water), of the formula

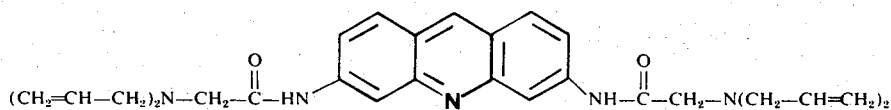

was obtained from 3,6-bis-(chloroacetyl-amino)-acridine and diallylamine.

EXAMPLE 17

Using a procedure analogous to that described in Example 13, 65% of theory of 3,6-bis-[(N,N-di-n-hexylaminoacetyl)-amino]-acridine, m.p. 95°–96°C (recrystallized from ethanol/water, was obtained from 3,6-bis-(chloroacetyl-amino)-acridine and di-n-hexylamine.

EXAMPLE 18

Using a procedure analogous to that described in Example 13, 91% of theory of 3,6-bis-[(pyrrolidinoacetyl)-amino]-acridine, m.p. 191°–193°C (recrystallized from ethanol/water), of the formula

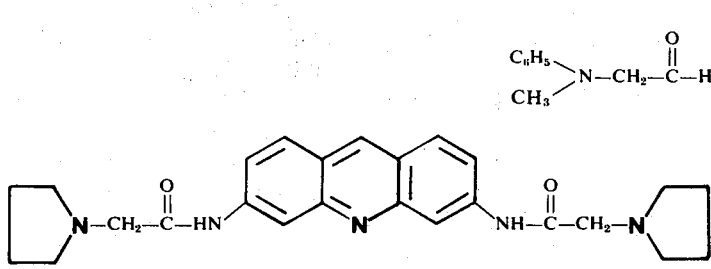

was obtained from 3,6-bis-(chloroacetyl-amino)-acridine and pyrrolidine.

EXAMPLE 19

Using a procedure analogous to that described in Example 13, 78% of theory of 3,6-bis-[(N-cyclohexyl-N-methylamino-acetyl)-amino]-acridine, m.p. 167°–169°C (recrystallized from ethanol/water), of the formula

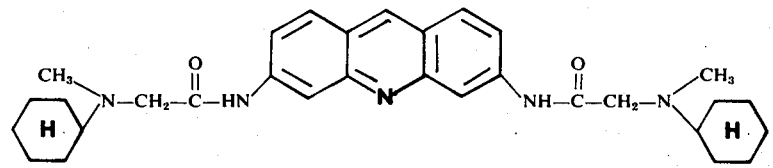

was obtained from 3,6-bis-(chloracetyl-amino)-acridine and N-cyclohexyl-methylamine.

EXAMPLE 20

Using a procedure analogous to that described in Example 13, 68% of theory of 3,6-bis-[(N-benzyl-N-methylamino-acetyl)-amino]-acridine, m.p. 142°–145°C (recrystallized from ethanol/water), of the formula

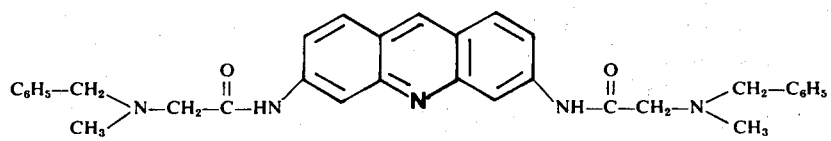

was obtained from 3,6-bis-(chloroacetyl-amino)-acridine and N-benzyl-methylamine.

EXAMPLE 21

Using a procedure analogous to that described in Example 13, 65.7% of theory of 3,6-bis-[(N,N-dibenzylaminoacetyl)-amino]-acridine hemihydrate, m.p. 159°–161°C (recrystallized from dioxane/water), was obtained from 3,6-bis-(chloroacetyl-amino)-acridine and dibenzylamine.

EXAMPLE 22

Using a procedure analogous to that described in Example 13, 29% of theory of 3,6-bis-[(N-phenyl-N-methylamino-acetyl)-amino]-acridine, m.p. 155°–157°C (recrystallized from ethanol, of the formula

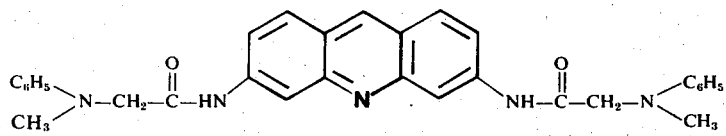

was obtained from 3,6-bis-(chloroacetyl-amino)-acridine and N-methyl-aniline.

EXAMPLE 23

Using a procedure analogous to that described in Example 13, 62% of theory of 3,6-bis-[(N-cyclohexyl-N-ethyl-amino-acetyl)-amino]-acridine hemihydrate, an amorphous powder (precipitated from dilute hydrochloric acid with aqueous ammonia), was obtained from 3,6-bis-(chloroacetyl-amino)-acridine and N-cyclohexyl-ethylamine.

EXAMPLE 24

Using a procedure analogous to that described in Example 13, 71% of theory of 3,6-bis-[(N-cyclohexyl-N-n-propyl-amino-acetyl)-amino]-acridine hemihydrate, an amorphous powder (precipitated from dilute hydrochloric acid with aqueous ammonia), was obtained from 3,6-bis-(chloroacetyl-amino)-acridine and N-cyclohexyl-n-propylamine.

EXAMPLE 25

Using a procedure analogous to that described in Example 13, 71% of theory of 3,6-bis-[(N-cyclohexyl-N-n-butyl-amino-acetyl)-amino]-acridine, m.p. 179°–182°C (recrystallized from ethanol/dioxane/water), was obtained from 3,6-bis-(chloroacetyl-amino)-acridine and N-cyclohexyl-n-butylamine.

EXAMPLE 26

Using a procedure analogous to that described in Example 13, 58% of theory of 3,6-bis-[(N-cyclopentyl-N-n-butyl-amino-acetyl)-amino]-acridine hemihydrate, an amorphous powder (precipitated from dilute hydrochloric acid with aqueous ammonia), was obtained from 3,6-bis-(chloroacetyl-amino)-acridine and N-cyclopentyl-n-butylamine.

EXAMPLE 27

3,6-Bis-[(N-adamantylamino-acetyl)-amino]-acridine hydrate

A mixture consisting of 3 gm of 3,6-bis-(chloroacetyl-amino)-acridine, 50 ml of dimethylformamide and 6 gm of 1-adamantanamine was heated for 5 hours at 80°C. Thereafter, the reaction mixture was allowed to stand for a few days at room temperature and was then stirred into water. The precipitate formed thereby was collected and dried, yielding 28% of theory of an amorphous substance which was identified to be 3,6-bis-[(N-adamantylamino-acetyl)-amino]-acridine hydrate.

EXAMPLE 28

3,6-Bis-[(thiomorpholino-S-oxide-acetyl)-amino]-acridine hemihydrate

A solution of 5.0 gm (0.013 mol) of 3,6-bis-(chloroacetyl-amino)-acridine in 25 ml of dimethylformamide was admixed with 8.7 gm of thiomorpholine-S-oxide, and the mixture was heated for 4 hours at 100°C and then allowed to stand overnight at room temperature. The crystals formed thereby were collected by vacuum filtration, washed with ethyl acetate, dissolved in 250 ml of hot dioxane, and the solution was admixed with 500 ml of dilute ammonia, whereby an amorphous precipitate was formed which gradually crystallized throughout. Careful concentration of the solution to about 400 ml in vacuo at 60°C accelerated the crystallization. 68% of theory of the compound of the formula with a melting point of 177°–179°C was obtained.

EXAMPLE 29

Using a procedure analogous to that described in Example 28, 73% of theory of 3,6-bis-[(thiomorpholino-acetyl)-amino]-acridine hemihydrate, m.p. 140°–150°C (recrystallized from dioxane/ethanol/dilute ammonia), was obtained from 3,6-bis-(chloroacetyl-amino)-acridine and thiomorpholine.

EXAMPLE 30

Using a procedure analogous to that described in Example 28, 83% of theory of 3,6-bis-[(thiomorpholino-S,S-dioxide-acetyl)-amino]-acridine hydrate, m.p. 190°–192°C (recrystallized from dioxane/ethanol/dilute ammonia), was obtained from 3,6-bis-(chloroacetyl-amino)-acridine and thiomorpholine-S,S-dioxide.

EXAMPLE 31

Using a procedure analogous to that described in Example 28, 76% of theory of 3,6-bis-[(cyclohexylaminoacetyl)-amino]-acridine, m.p. 252°–255°C (recrystallized from ethanol/dilute ammonia), was obtained from 3,6-bis-(chloroacetyl-amino)-acridine and cyclohexylamine.

EXAMPLE 32

Using a procedure analogous to that described in Example 28, 56% of theory of 3,6-bis-[(isopropylamino-acetyl)-amino]-acridine, m.p. 233°–236°C (recrystallized from ethanol/dilute ammonia), was obtained from 3,6-bis-(chloroacetylamino)-acridine and isopropylamine.

EXAMPLE 33

3,6-Bis-[(3'-methylpiperidino-acetyl)-amino]-acridine hemihydrate

A mixture consisting of 4.0 gm (0.011 mol) of 3,6-bis-(chloroacetyl-amino)-acridine, 4.0 gm (0.04 mol) of 3-methyl-piperidine and 25 ml of dimethylformamide was heated for 3 hours at 60°C. Thereafter, the clear reaction solution was introduced into 200 ml of dilute aqueous ammonia, accompanied by vigorous stirring, and the yellow precipitate formed thereby was collected by vacuum filtration, washed with water, dried in vacuo over phosphorus pentoxide at room temperature, and recrystallized first from 40 ml of hot ethanol and then from 150 ml of water. 71% of theory of the compound of the formula

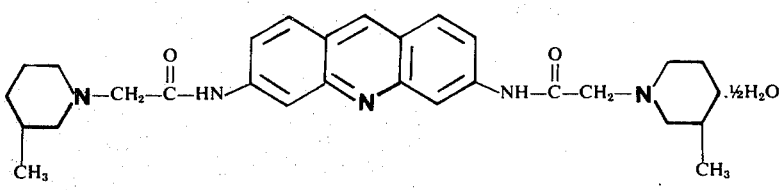

with a melting point of 97°–102°C was obtained.

EXAMPLE 34

Using a procedure analogous to that described in Ex-

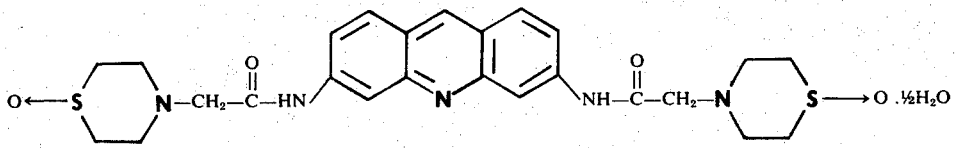

ample 33, 75% of theory of 3,6-bis-[(2'-methyl-piperidinoacetyl)-amino]-acridine hemihydrate, m.p. 128°–130°C (recrystallized from ethanol/dilute ammonia), was obtained from 3,6-bis-(chloroacetyl-amino)-acridine and 2-methyl-piperidine.

EXAMPLE 35

Using a procedure analogous to that described in Example 33, 68% of theory of 3,6-bis-[(4'-methyl-piperidinoacetyl)-amino]-acridine hemihydrate, m.p. 218°–222°C (recrystallized from ethanol/dioxane/dilute ammonia), was obtained from 3,6-bis-(chloroacetyl-amino)-acridine and 4-methyl-piperidine.

EXAMPLE 36

Using a procedure analogous to that described in Example 33, 84% of theory of 3,6-bis-[(4'-ethoxycarbonylpiperidino-acetyl)-amino]-acridine hemihydrate, m.p. 178°–182°C (recrystallized from methanol/dilute ammonia), of the formula

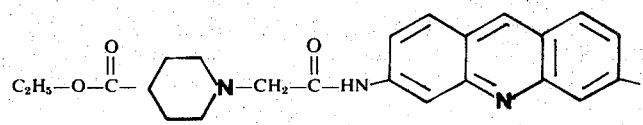
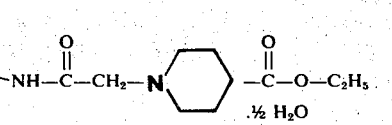

was obtained from 3,6-bis-(chloroacetyl-amino)-acridine and 4-ethoxycarbonyl-piperidine.

EXAMPLE 37

Using a procedure analogous to that described in Example 33, 71% of theory of 3,6-bis-[1',2',5',6'-tetrahydropyridino-acetyl)-amino]-acridine hemihydrate, m.p. 95°–100°C (recrystallized from ethanol/water), was obtained from 3,6-bis-(chloroacetyl-amino)-acridine and 1,2,5,6-tetrahydropyridine.

EXAMPLE 38

Using a procedure analogous to that described in Example 33, 49% of theory of 3,6-bis-[(N'-β-hydroxyethyl-piperazino-acetyl)-amino]-acridine dihydrate, m.p. 228°–233°C (recrystallized from ethanol), of the formula

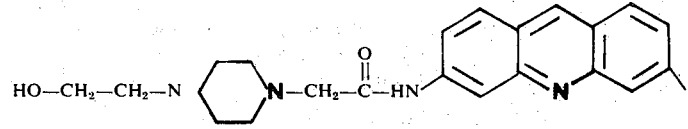
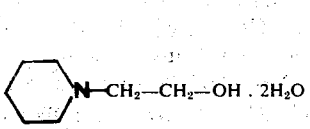

was obtained from 3,6-bis-(chloroacetyl-amino)-acridine and 4-β-hydroxyethyl-piperazine.

EXAMPLE 39

Using a procedure analogous to that described in Example 33, 75% of theory of 3,6-bis-[(hexamethyleneimino-acetyl)-amino]-acridine, m.p. 190°–193°C (recrystallized from ethanol/water), was obtained from 3,6-bis-(chloroacetyl-amino)-acridine and hexamethyleneimine.

EXAMPLE 40

Using a procedure analogous to that described in Example 33, 71% of theory of 3,6-bis-[(4'-hydroxymethyl-piperidino-acetyl)-amino]-acridine · ½ H₂O, m.p. 145°–150 C (recrystallized from methanol/water), was obtained from 3,6-bis-(chloroacetyl-amino)-acridine and 4-hydroxy-methyl-piperidine.

EXAMPLE 41

Using a procedure analogous to that described in Example 33, 89% of theory of 3,6-bis-[(benzylamino-acetyl)-amino]-acridine, m.p. 195°–197°C (recrystallized from dioxane/ethanol/water), was obtained from 3,6-bis-(chloroacetyl-amino)-acridine and benzylamine.

EXAMPLE 42

Using a procedure analogous to that described in Example 33, 75% of theory of 3,6-bis-[(n-butyl-amino-acetyl)-amino]-acridine, m.p. 182°–185°C (recrystallized from ethanol/dioxane/water), was obtained from 3,6-bis-(chloroacetyl-amino)-acridine and n-butylamine.

EXAMPLE 43

Using a procedure analogous to that described in Example 33, 81% of theory of 3,6-bis-[(n-propyl-amino-acetyl)-amino]-acridine, m.p. 185°–187°C (recrystallized from dioxane/water/ethanol), was obtained from 3,6-bis-(chloroacetyl-amino)-acridine and n-propylamine.

EXAMPLE 44

Using a procedure analogous to that described in Example 33, 66% of theory of 3,6-bis-[(n-hexylamino-acetyl)-amino]-acridine, m.p. 182°–185°C (recrystallized from ethanol/water), was obtained from 3,6-bis-(chloroacetyl-amino)-acridine and n-hexylamine.

EXAMPLE 45

Using a procedure analogous to that described in Example 33, 83% of theory of 3,6-bis-[(N-cyclohexyl-cyclopropylamino-acetyl)-amino]-acridine, an amorphous powder (precipitated from dimethylformamide/methanol/water), was obtained from 3,6-bis-(chloroacetyl-amino)-acridine and N-cyclohexyl-cyclopropylamine.

EXAMPLE 46

Using a procedure analogous to that described in Example 33, 49% of theory of 3,6-bis-[(N'-methyl-piperazino-acetyl)-amino]-acridine hemihydrate, m.p. 232°–235°C (recrystallized from water), was obtained from 3,6-bis-(chloroacetyl-amino)-acridine and N-methyl-piperazine.

EXAMPLE 47

3,6-Bis-[(3'-hydroxypiperidino-acetyl)amino]-acridine hemihydrate

A solution of 4.0 gm (0.011 mol) of 3,6-bis-(chloroacetyl-amino)-acridine in 25 ml of dimethylformamide was admixed with 40 gm (0.039 mol) of 3-hydroxy-piperidine, and the mixture was heated for 3 hours at 80°C. After the reaction had gone to completion, the reaction mixture was concentrated to about 10 ml by evaporation in vacuo, and then 200 ml of acetone as well as 40 ml of ethereal hydrochloric acid were added. The yellow precipitate formed thereby was collected by vacuum filtration, washed with water, dried and dissolved in 150 ml of hot water. While stirring the aqueous solution, 30 ml of aqueous 25% ammonia were added, and the precipitate formed thereby was collected and crystallized first from 20 ml of ethanol and then from 50 ml of dilute ammonia, yielding 86% of theory of the compound of the formula

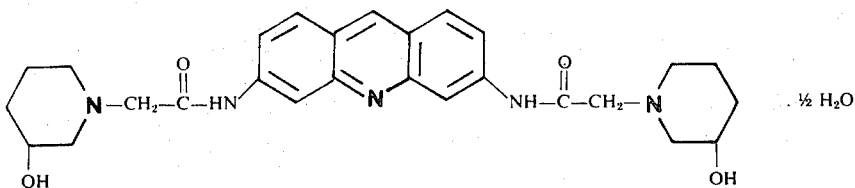

which had a melting poing of 128°–130°C.

EXAMPLE 48

Using a procedure analogous to that described in Example 47, 70% of theory of 3,6-bis-[(4'-hydroxypiperidino-acetyl)-amino]-acridine hydrate, m.p. 232°–235°C, was obtained from 3,6-bis-(chloroacetyl-amino)-acridine and 4-hydroxy-piperidine.

EXAMPLE 49

3,6-Bis-[α-(2'-methylpiperidino)-propionyl-amino]-acridine hemihydrate

A mixture consisting of 6.0 gm of 3,6-bis-(α-chloropropionyl-amino)-acridine, 15.2 gm of 2-methyl-piperidine and 50 ml of dimethylformamide was heated for 5 hours at 100°C. Thereafter, the reaction mixture was concentrated by evaporation in vacuo to a small volume, admixed with 150 ml of ethyl acetate, and the 2-methylpiperidine hydrochloride precipitated thereby was separated by filtration. The filtrate was evaporated, the residue was dissolved in 100 ml of ethanol at 80°C, and the solution was admixed with about 60 ml of water until it started to turn cloudy. The precipitate formed thereby was collected and recrystallized from 70 ml of ethanol and 30 ml of water, yielding 6.55 gm (82% of theory) of the compound of the formula

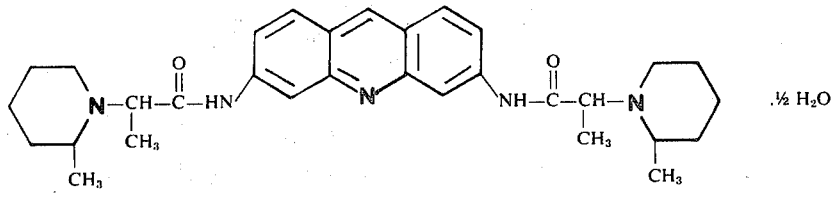

which had a melting point of 135°–143°C.

EXAMPLE 50

Using a procedure analogous to that described in Example 49, 68% of theory of 3,6-bis-[α-(piperidino)-propionyl-amino]-acridine hydrate, m.p. 197°–201°C (recrystallized from ethanol), was obtained from 3,6-bis-(α-chloropropionylamino)-acridine and piperidine.

EXAMPLE 51

Using a procedure analogous to that described in Example 49, 58% of theory of 3,6-bis-[α-(3'-methylpiperidino)-propionyl-amino]-acridine hydrate, m.p. 160°–164°C (recrystallized from ethanol), was obtained from 3,6-bis-(α-chloropropionyl-amino)-acridine and 3-methyl-piperidine.

EXAMPLE 52

Using a procedure analogous to that described in Example 49, 56% of theory of 3,6-bis-[α-(4'-methylpiperidino)-propionyl-amino]-acridine hydrate, m.p. 182°–186°C (recrystallized from ethanol/water), was obtained from 3,6-bis-(α-chloropropionyl-amino)-acridine and 4-methyl-piperidine.

EXAMPLE 53

Using a procedure analogous to that described in Example 49, 58% of theory of 3,6-bis-[α-(1',2',5',6'-tetrahydropyridino)-propionyl-amino]-acridine hemihydrate, an amorphous powder (precipitated from dilute hydrochloric acid with aqueous ammonia), was obtained from 3,6-bis-(α-chloropropionyl-amino)-acridine and 1,2,5,6-tetrahydropyridine.

EXAMPLE 54

Using a procedure analogous to that described in Example 49, 59% of theory of 3,6-bis-[α-(N-cyclohexyl-methyl-amino)-propionyl-amino]-acridine, m.p. 85°–90°C (recrystallized from ethanol/water), was obtained from 3,6-bis-(α-chloropropionyl-amino)-acridine and N-cyclohexyl-methylamine.

EXAMPLE 55

Using a procedure analogous to that described in Example 49, 56% of theory of 3,6-bis-[α-(cyclohexylamino)-propionyl-amino]-acridine hydrate, m.p. 180°–184°C (recrystallized from ethanol), was obtained from 3,6-bis-(α-chloropropionyl-amino)-acridine and cyclohexylamine.

EXAMPLE 56

3,6-Bis-[α-(hexamethyleneimino)-butyryl-amino]-acridine

A solution of 6.0 gm of 3,6-bis-(α-bromobutyrylamino)-acridine in 20 ml of dimethylformamide was admixed with 11.7 gm of hexamethyleneimine, and the mixture was allowed to stand for 5 hours at 70°C. Thereafter, the reaction mixture was poured into 600 ml of water, and the precipitated solids were collected by high-vacuum filtration, dissolved in 200 ml of hot ethanol, the solution was admixed with 120 ml of water, and the mixture was allowed to stand in a refrigerator. The crystalline substance which separated out was collected, yielding 5.27 gm (82% of theory) of the compound of the formula

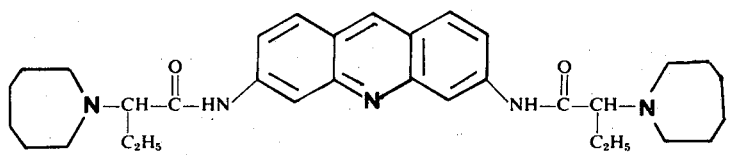

which had a melting point of 116°–118°C.

EXAMPLE 57

Using a procedure analogous to that described in Example 56, 78% of theory of 3,6-bis-[(α-piperidino-butyryl)-amino]-acridine hemihydrate, m.p. 103°–106°C (recrystallized from ethanol/water), was obtained from 3,6-bis-(α-chlorobutyryl-amino)-acridine and piperidine.

EXAMPLE 58

Using a procedure analogous to that described in Example 56, 80% of theory of 3,6-bis-[α-(2'-methyl-piperidino)-butyryl-amino]-acridine hemihydrate, m.p. 122°–124°C (recrystallized from ethanol/water), was obtained from 3,6-bis-(α-chlorobutyryl-amino)-acridine and 2-methyl-piperidine.

EXAMPLE 59

Using a procedure analogous to that described in Example 56, 82% of theory of 3,6-bis-[α-(3'-methyl-piperidino)-butyryl-amino]-acridine hydrate, m.p. 120°–125°C (recrystallized from ethanol/water), was obtained from 3,6-bis-(α-chlorobutyryl-amino)-acridine and 3-methyl-piperidine.

EXAMPLE 60

Using a procedure analogous to that described in Example 56, 58% of theory of 3,6-bis-[α-(4'-methyl piperidino)-butyryl-amino]-acridine hemihydrate, m.p. 105°–108°C (recrystallized from ethanol/water), was obtained from 3,6-bis-(α-chlorobutyryl-amino)-acridine and 4-methyl-piperidine.

EXAMPLE 61

Using a procedure analogous to that described in Example 56, 30% of theory of 3,6-bis-[α-(N-methyl-cyclohexyl-amino)-butyryl-amino]-acridine, an amorphous powder (precipitated from dilute hydrochloric acid with aqueous ammonia), was obtained from 3,6-bis-(α-chlorobutyryl-amino)-acridine and N-cyclohexyl-methylamine.

EXAMPLE 62

Using a procedure analogous to that described in Example 56, 60% of theory of 3,6-bis-[α-(1',2',5',6'-tetrahydropyridino)-butyryl-amino]-acridine hemihydrate, an amorphous powder (precipitated from dilute hydrochloric acid with aqueous ammonia), was obtained from 3,6-bis-(α-chlorobutyryl-amino-acridine and 1,2,5,6-tetrahydropyridine

EXAMPLE 63

Using a procedure analogous to that described in Example 56, 82.2% of theory of 3,6-bis-[(α-hexamethyleneimino-butyryl)-amino]-acridine, m.p. 116°–118°C (recrystallized from ethanol/water), was obtained from 3,6-bis-(α-chlorobutyryl-amino)-acridine and hexamethyleneimine.

EXAMPLE 64

3,6-Bis-[(α-1',2',5',6'-tetrahydropyridino-isobutyryl)-amino]-acridine · 1½ H₂O 9.8 gm of 1,2,5,6-tetrahydro-pyridine were added to a solution of 6.0 gm of 3,6-bis-(α-bromo-isobutyrylamino)-acridine in 30 ml of dimethylformamide, and the mixture was allowed to stand for 5 hours at 70°C. Thereafter, the reaction solution was allowed to cool and was then stirred into 600 ml of water. The precipitate formed thereby was collected, dissolved in 100 ml of 1 N hydrochloric acid, and the resulting solution was first diluted with 50 ml of water and then admixed with 100 ml of 1 N ammonia. The precipitate formed thereby was collected and recrystallized first from 200 ml of ethanol and then from 100 ml of water, yielding 5.0 gm (82% of theory) of the compound of the formula

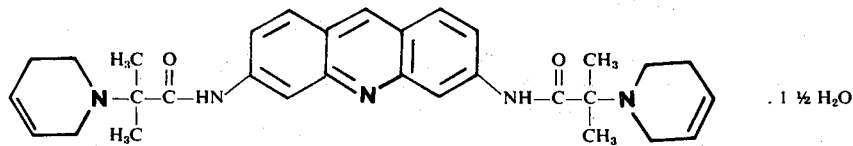

which had a melting point of 117°–122°C.

EXAMPLE 65

Using a procedure analogous to that described in Example 64, 70.9% of theory of 3,6-bis-[(α-piperidino-isobutyryl)-amino]-acridine trihydrate, m.p. 131°–137°C (recrystallized from ethanol), was obtained from 3,6-bis-(α-chloroisobutyryl-amino)-acridine and piperidine.

EXAMPLE 66

Using a procedure analogous to that described in Example 64, 64% of theory of 3,6-bis-[(α-hexamethyleneimino-isobutyryl)-amino]-acridine · 2.5 H₂O, m.p. 100°–102°C (recrystallized from ethanol/water), was obtained from 3,6-bis-(α-chloroisobutyryl-amino)-acridine and hexamethyleneimine.

EXAMPLE 67

Using a procedure analogous to that described in Example 64, 55.5% of theory of 3,6-bis-[(α-2'-methylpiperidino-isobutyryl)-amino]-acridine, m.p. 125°-128°C (recrystallized from ethanol/water), was obtained from 3,6-bis-(α-chlororisobutyryl-amino)-acridine and 2-methyl-piperidine.

EXAMPLE 68

Using a procedure analogous to that described in Example 64, 60% of theory of 3,6-bis-[(α-3'-methylpiperidino-isobutyryl)-amino]-acridine, m.p. 107°-110°C (recrystallized from ethanol/water), was obtained from 3,6-bis-(α-chloroisobutyryl-amino)-acridine and 3-methyl-piperidine.

EXAMPLE 69

Using a procedure analogous to that described in Example 64, 52% of theory of 3,6-bis-[(α-4'-methylpiperidino-isobutyryl)-amino]-acridine, m.p. 133°-135°C (recrystallized from ethanol/water), was obtained from 3,6-bis-(α-chloroisobutyryl-amino)-acridine and 4-methyl-piperidine.

The compounds of the present invention, that is, those embraced by formula I above and their non-toxic, pharmacologically acceptable acid addition salts, have useful pharmacodynamic properties. More particularly, the compounds of the instant invention induce or stimulate the formation and release of interferon in vitro, as well as in vivo in warm-blooded animals, such as mice.

Particularly effective in this respect are those compounds of the formula I wherein $R_1$ is hydrogen, $R_2$ and $R_3$ are methyl, ethyl, piperidino or cyclohexyl, and A is lower alkylene.

Interferon is a protein formed during the interaction of animal cells with viruses, which is capable of conferring on fresh animal cells of the same species a long-lasting resistance to infection with a wide range of viruses. In other words, the activity of an interferon is non-specific with respect to viruses, but specific with respect to the particular animal species.

In the absence of direct prophylactic or therapeutic methods for effectively combatting various virus infections, pharmacologists have long searched for compounds which are capable of significantly stimulating the formation of interferon. Although a number of compounds have been suggested for this purpose, such as living or killed viruses, endotoxin, phytohemagglutinin, trachoma and double-strand complexes of polyinosinic acid and polycytidylic acid, the utility of these substances for the treatment of virus infections is significantly restricted due to serious drawbacks, such as low activity.

The effectiveness of the compounds of the present invention to stimulate the formation of interferon is illustrated by the following tests:

The test compound was administered perorally, with the aid of an esophageal sound, to a group of three to five SPF-strain laboratory mice of about 20 gm body weight. For this purpose the test compound was either dissolved in water or aqueous 20% acetic acid, or, in case of an insoluble compound, suspended in these vehicles after addition of 0.4% of methylcellulose. The dosage levels were 250 and 50 mgm/kg. 24 hours after administration of the test compound, the thorax of the animals was opened the blood was withdrawn by heart puncture, the blood from all the animals was pooled, and the serum was prepared.

The serum thus obtained was investigated for interferon content in a tissue culture. For this purpose, monolayer-cultures of tissue cells from mice of the L-929 lineage were incubated for 24 hours with the serum sample under investigation. Each serum was tested in five different stages of dilution, and the test for each stage of dilution was repeated 3 times. Thereafter, the cultures were infested with vesicular stomatitis virus, and the virus propagation was determined 48 hours later by dyeing the cell turf with gentiana violet and counting the plaques which had formed.

The values thus obtained were plotted on a graph of dilution vs. number of plaques, and the degree of dilution which produced a 50% inhibition in the number of plaques formed in comparison to a serum obtained from untreated controls was graphically determined and was considered, by definition, to contain one biological unit. In order to be able to compare different tests with each other, a mouse interfron standard was always tested at the same time, and deviations, if any, from the theoretical value were corrected accordingly.

The following table shows the results obtained for a representative group of compounds of the present invention,
where A = 3,6-bis-[(N,N-diethylamino-acetyl)-amino]-acridine, B = 3,6-bis-[(2'-N,N-diethylamino-propionyl)-amino]-acridine, C = 3,6-bis-[(piperidino-acetyl)-amino]-acridine, and D = 3,6-bis-[(N-cyclohexyl-methylamino)-acetyl-amino]-acridine.

| Compound | Dose mgm/kg | Biological Units/ml serum |
|---|---|---|
| A | 50 | 22 |
|   | 250 | 410 |
| B | 50 | 8 |
|   | 250 | 330 |
| C | 50 | 83 |
|   | 250 | 690 |
| D | 50 | 13 |
|   | 250 | 310 |

Serum of untreated controls: 0 to maximum 6 units/ml. Thus, by virtue of their interferon production inducing activity, the compounds of the present invention are useful and effective for combatting a wide variety of virus infections in warm-blooded animals. In addition to vesicular stomatitis virus, the compounds of the invention will also effectively combat other viruses, such as arbor viruses, picona viruses, herpes virus, pox viruses, myxoviruses and the like.

Since interferon is, to a certain extent, also known to be effective against non-viral pathogens, such as Chlamydia and protozoa (for example, the cause of psittacosis, the TRIC-agent, toxoplasma gondii and plasmodium berghei), the interferon production inducers of the present invention are also believed to be useful for combatting non-viral infections and non-viral benign tumors.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective interferon-producing dosage unit of the compounds according to the present invention is from 1.66 to 16.7 mgm/kg body weight, preferably 4.15 to 8.3 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 70

Coated pills

The pill core composition is compounded from the following ingredients:

| | | |
|---|---|---|
| 3,6-Bis[(N,N-diethylamino-acetyl)-amino]-acridine trihydrochloride | 500.0 | parts |
| Lactose | 200.0 | " |
| Corn starch | 80.0 | " |
| Gelatin | 12.0 | " |
| Magnesium stearate | 8.0 | " |
| Total | 800.0 | parts |

Preparation:

The acridine compound, the lactose and the corn starch are intimately admixed with each other, the mixture is moistened with an aqueous 10% solution of the gelatin, the moist mass is granulated through a 1 mm-mesh screen, and the granulate is dried at 40°C, again passed through the screen and admixed with the magnesium stearate. The composition is then compressed into 800 mgm-pill cores which are subsequently coated with a thin shell consisting essentially of a mixture of sugar, titaniumdidioxide, talcum and gum arabic, and finally polished with beeswax. Each coated pill contains 500 mgm of the acridine compound and is an oral dosage unit composition with effective interferon production inducing action.

EXAMPLE 71

Tablets

The tablet composition is compounded from the following ingredients:

| | | |
|---|---|---|
| 3,6-Bis-[(2'-N,N-diethylamino-propionyl)-amino]-acridine trihydrochloride dihydrate | 500.0 | parts |
| Lactose | 200.0 | " |
| Corn starch | 130.0 | " |
| Soluble starch | 12.0 | " |
| Magnesium stearate | 8.0 | " |
| Total | 850.0 | parts |

Preparation:

The acridine compound and the magnesium stearate are intimately admixed with each other, the mixture is granulated with an aqueous solution of the soluble starch, the granulate is dried and thoroughly admixed with the lactose and the corn starch, and the resulting composition is compressed into 850 mgm-tablets in a conventional tablet making machine. Each tablet contains 500 mgm of the acridine compound and is an oral dosage unit composition with effective interferon production inducing action.

EXAMPLE 72

Capsules

The capsule filler composition is compounded from the following ingredients:

| | | |
|---|---|---|
| 3,6-Bis-[(piperidino-acetyl)-amino]-acridine | 500.0 | parts |
| Gelatin | 2.0 | " |
| Total | 502.0 | parts |

Preparation:

The acridine compound and the gelatin are admixed with each other, the mixture is granulated with an aqueous solution of gelatin, the granulate is dried, and 502 mgm-portions of the dry granulate are filled into gelatin capsules of suitable size. Each capsule contains 500 mgm of the acridine compound and is an oral dosage unit composition with effective interferon production inducing action.

EXAMPLE 73

Solution

The solution is compounded from the following ingredients:

| | | |
|---|---|---|
| 3,6-Bis-[(N-cyclohexyl-methylamino-acetyl)-amino]-acridine | 25.0 | parts |
| Sodium hydrogen phosphate . 2 H$_2$O | 0.25 | " |
| Disodium hydrogen phosphate | 4.50 | " |
| Methyl p-hydroxy-benzoate | 0.17 | " |
| Propyl p-hydroxy-benzoate | 0.07 | " |
| Sorbitol | 180.00 | " |
| Saccharin sodium | 5.00 | " |
| Flavoring | 0.25 | " |
| Ethanol | 50.00 | " |
| Distilled water q.s.ad | 500.00 | " |
| | | by vol. |

Preparation:

The sodium hydrogen phosphate, the disodium hydrogen phosphate, the saccharin sodium, the sorbitol and the acridine compound are dissolved in about 300 parts by volume of distilled water (solution I).

The two p-hydroxy-benzoates and the flavoring are dissolved in the ethanol (solution II).

Solution I is admixed with solution II, and the mixed solution is diluted with distilled water to 500 parts by volume.

Each 5 ml of the solution contain 250 mgm of the acridine compound and are an oral dosage unit composition with effective interferon production inducing action.

Analogous results are obtained when any one of the other acridine derivatives embraced by formula I or a non-toxic, pharmacologically acceptable acid addition salt thereof is substituted for the particular acridine compound in Examples 70 through 73. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will

We claim:

1. A compound of the formula

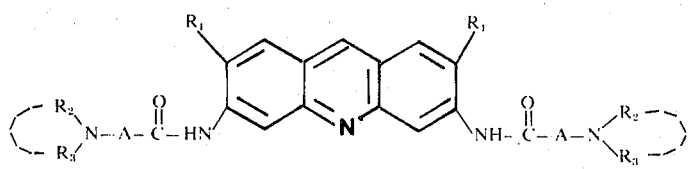

wherein
$R_1$ is hydrogen or methyl, $R_2$ and $R_3$ are each hydrogen, lower alkyl, hydroxy-lower alkyl, lower alkylamino-lower alkyl, 3-8 carbon cycloalkyl, benzyl, or phenyl, and A is lower alkylene or phenyl-lower alkylene, or a non-toxic, pharmacologically acceptable acid addition salt thereof.

2. A compound of claim 1, wherein
$R_1$ is hydrogen,
$R_2$ and $R_3$ are each methyl, ethyl or cyclohexyl, and
A is lower alkylene or phenyl-lower alkylene.

3. A compound of claim 2, which is 3,6-bis-[(N,N-diethylamino-acetyl)-amino]-acridine or a non-toxic, pharmacologically acceptable acid addition salt thereof.

4. A compound of claim 2, which is 3,6-bis-[(2'-N,N-diethylamino-propionyl)-amino]-acridine or a non-toxic, pharmacologically acceptable acid addition salt thereof.

5. A compound of claim 2, which is 3,6-bis-[(N-cyclohexyl-methylamino-acetyl)-amino]-acrridine or a non-toxic, pharmacologically acceptable acid addition salt thereof.

* * * * *